US006341886B1

(12) United States Patent

Dussans et al.

(10) Patent No.: US 6,341,886 B1
(45) Date of Patent: Jan. 29, 2002

(54) MOTOR VEHICLE HEADLIGHT HAVING MEANS FOR SELECTIVELY EMITTING A BEAM FOR DRIVING ON THE LEFT OR ON THE RIGHT

(75) Inventors: Philippe Dussans, Paris; Gérard Billot, Montfermeil, both of (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 09/375,139

(22) Filed: Aug. 16, 1999

(30) Foreign Application Priority Data

Aug. 18, 1998 (FR) .......................................... 98 10503
Dec. 23, 1998 (FR) .......................................... 98 16320

(51) Int. Cl.[7] ............................................. B60Q 1/04
(52) U.S. Cl. ...................... 362/523; 362/539; 362/548; 362/289
(58) Field of Search ................................ 362/523, 529, 362/539, 548, 549, 289, 429, 430, 428, 287, 518, 530

(56) References Cited

U.S. PATENT DOCUMENTS 1,483,070 A * 2/1924 Buchanan ................... 362/523
2,021,563 A 11/1935 Melish
2,121,310 A * 6/1938 Watts ......................... 362/548
5,711,597 A * 1/1998 Unno ......................... 362/457

FOREIGN PATENT DOCUMENTS

| | | |
|---|---|---|
| DE | 43 07 110 | 9/1994 |
| DE | 197 18 335 | 11/1998 |
| FR | 1100334 | 9/1955 |

OTHER PUBLICATIONS

French Search Report dated May 3 1999.

* cited by examiner

*Primary Examiner*—Y. My Quach-Lee
(74) *Attorney, Agent, or Firm*—Morgan & Finnegan LLP

(57) ABSTRACT

A headlight for a motor vehicle is provided for generating a light beam, and particularly a dipped beam, of a given configuration. The headlight has a light source, a reflector of the elliptical type having a first focus in the vicinity of which the light source is situated, and a lens placed in front of the reflector. The reflector has at least two zones which are situated side by side and which are adapted to form, in a focal region of the lens, patches of light which are preformed in width, and overlap each other in a horizontal direction.

16 Claims, 7 Drawing Sheets

MOTOR VEHICLE HEADLIGHT HAVING MEANS FOR SELECTIVELY EMITTING A BEAM FOR DRIVING ON THE LEFT OR ON THE RIGHT

FIELD OF THE INVENTION

The present invention relates in general terms to motor vehicle headlights, and in particular to a novel dipped beam headlight which is able to be adapted in an extremely simple way for driving on the right or for driving on the left.

BACKGROUND OF THE INVENTION

Vehicle headlights of the elliptical type are well known in which the cut-off line of a dipped beam is defined by a mask or screen which is placed in the path of the light between a generally elliptical reflector and a convergent lens. In such a headlight, it has previously been proposed to make the form of the mask able to be modified selectively in such a way as to enable a beam to be produced respectively which is suitable for driving on the selected side of the road, i.e. on the right or on the left.

However, these arrangements are not able to be used in the case of a headlight in which the beam is formed directly by the reflector in cooperation with a light source (which may be partly masked). The above arrangements cannot be applied to a reflector of such a headlight, nor, where appropriate, to light-diverting elements such as striations or prisms formed on the cover glass of the headlight.

In this connection, in this type of headlight, one example of which is a light which uses a lamp of the "H4" normalised type in a parabolic reflector, the form of the reflector and/or the arrangement of the light-diverting elements is determinant to give a cut-off beam of good quality when driving on the required side of the road. In this connection, recourse to a so-called "vacation mask", consisting of a band of opaque adhesive applied in an appropriate place on the front glass or lens of the headlight when the vehicle has to change its driving mode between the left and right hand sides of the road, is a palliative with which the modified beam is in no way satisfactory in terms of visual comfort. Thus, dipped beam headlights for driving on the left and for driving on the right must in general have reflective surfaces and/or front cover glasses (lenses) which are different from each other.

In addition, the Company Valeo Vision has developed, over the last few years, reflectors having reflective surfaces which are adapted to produce, by themselves, beams capable of being used both in traffic driving on the right and in traffic driving on the left, with the required photometry, in particular in terms of the cut-off line, homogeneity of the beam, and beam width. However, here again, the reflective surface is designed specifically for driving on a given side of the road, and a single surface is not suitable for use in common for driving on both the left and the right.

In addition, there is today a tendency to equip vehicle headlights with discharge lamps, which are well known for their substantially superior light intensity as compared with that of a filament light, but with a much smaller power consumption.

The high intensity of this type of light source, together with the presence, in the vicinity of the luminous arc itself, of secondary light sources which result from the accumulation of salts in certain regions of the lamp, or which result from reflections on the electrodes, do however pose particular problems, which are partly resolved by a design which is particular to the reflecting surface of the reflector itself.

Thus, the specific character of the reflective surfaces, related to their exclusive suitability for driving on either the left or the right, is often even more pronounced with this type of lamp.

One consequence of this exclusivity is the need to provide different mould parts for the two types of traffic, and (if necessary) also different designs of mould cavity, which does of course lead to high tooling costs.

SUMMARY OF THE INVENTION

In order to overcome the limitations in the state of the art as discussed above, it would be highly beneficial to design a headlight in which not only a common reflective surface, but also a common type of lamp, could be used for a headlight that would be adaptable so that by simply moving the lamp within the headlight, the setting of the latter could be changed from a setting suitable for driving on the left to a setting suitable for driving on the right. An object of the present invention is to satisfy this need.

Thus the present invention aims to provide a headlight which first of all has a reflective surface which is adapted to generate, according to the position of the lamp, a dipped beam for driving on the left and a dipped beam for driving on the right, and which also includes means, of particularly simple, inexpensive and reliable construction, for the purpose of ensuring suitable positioning of the lamp in its orientation corresponding to the required driving mode, i.e. on the right or left hand side of the road.

According to the invention, a motor vehicle headlight comprising a reflector and a lamp mounted in the said reflector is characterised in that the reflector has a reflective surface adapted to generate selectively two types of dipped beam, for driving on the left and driving on the right respectively, the reflector cooperating with a lamp occupying in a corresponding manner one of two given angular positions, in that the reflector carries a support member which is able to rotate with respect to the said reflector and on which the said lamp is mounted fixedly, and in that actuating means are provided for manually rotating the support member to one or the other of two working positions, each working position corresponding to a given one of the said angular positions of the lamp, together with locating means for locating the assembly that consists of the support member and the lamp on the one hand, and a fixed part of the headlight on the other hand, whereby to ensure stability of the position of the support member in each of the said working positions.

The support member preferably has a generally circular form and is guided in rotation by arrangements provided at the rear of the reflector.

Preferably, the headlight includes a single locking device, firstly for securing the lamp fixedly on the support member, and secondly for providing axial retention of the support member with respect to the reflector. The said locking means preferably consists of an elastic hairpin fastener or spring clip, in engagement against smooth zones of the cap of the lamp.

The actuating means for the support member preferably include a link which is articulated on the support member.

Preferably, the actuating means further include an articulated lever, pivoted on the said link and adapted to displace the said link.

The actuating means may comprise a screw-and-nut assembly, one of the elements (screw or nut) of which is fixed to the said link for straight line or axial movement with the said link. In that case, one of the elements comprising the screw or nut is preferably formed on a housing of the headlight.

Preferably, the above mentioned locating means comprise at least one finger fixed to the reflector and biased resiliently towards a notch defined on the lamp cap. There is preferably more than one of these locating fingers, and preferably, each locating finger has a rounded end, with the said notch having a width smaller than the width of each finger.

The locating means may consist of the screw and nut assembly, the end of travel positions of which are determined in such a way as to correspond to the two working positions of the support member.

The cooperation between threads of the screw and nut assembly preferably has substantially no axial clearance, and a predetermined minimal coefficient of friction.

Preferably, the lamp is a discharge lamp equipped with masking means. Alternatively, the lamp may be a lamp comprising at least one incandescent filament equipped with a mask of the cup type.

Further features and advantages of the invention will appear more clearly on a reading of the following detailed description of some preferred embodiments of the invention, which are given by way of non-limiting example only and with reference to the accompanying drawings.

DESCRIPTION OF PREFERRED EMBODIMENTS OF THE INVENTION

Figure 3:
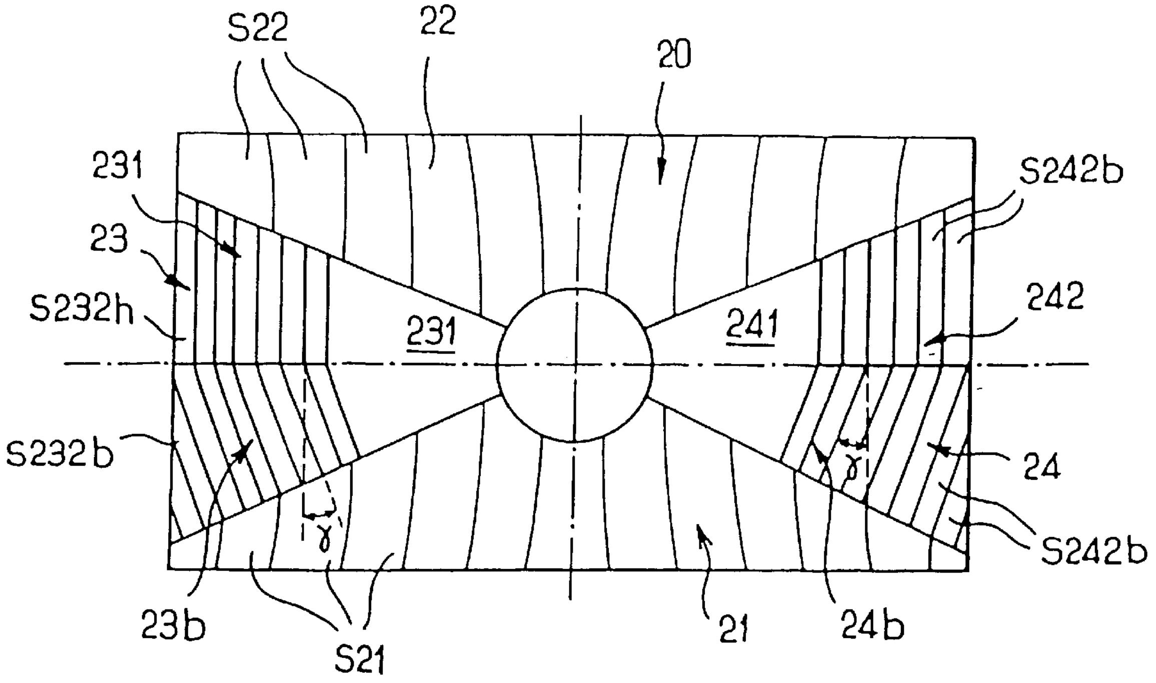
FIG. 3 is a more detailed back view of a preferred embodiment of the reflector of FIGS. 1*a* and 1*b*.
Figure 5:
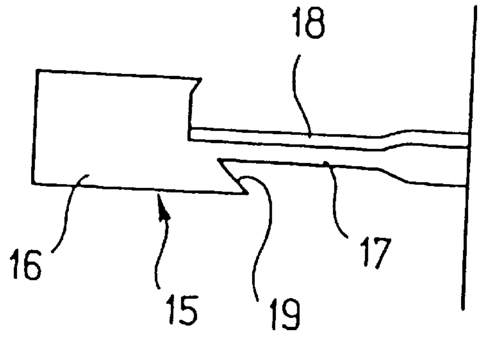
FIG. 5 is a side view in elevation of an occulting member, or mask, with which the reflector and lamp assembly of FIGS. 1*a*, 1*b* and 4 is equipped.
Figure 4:
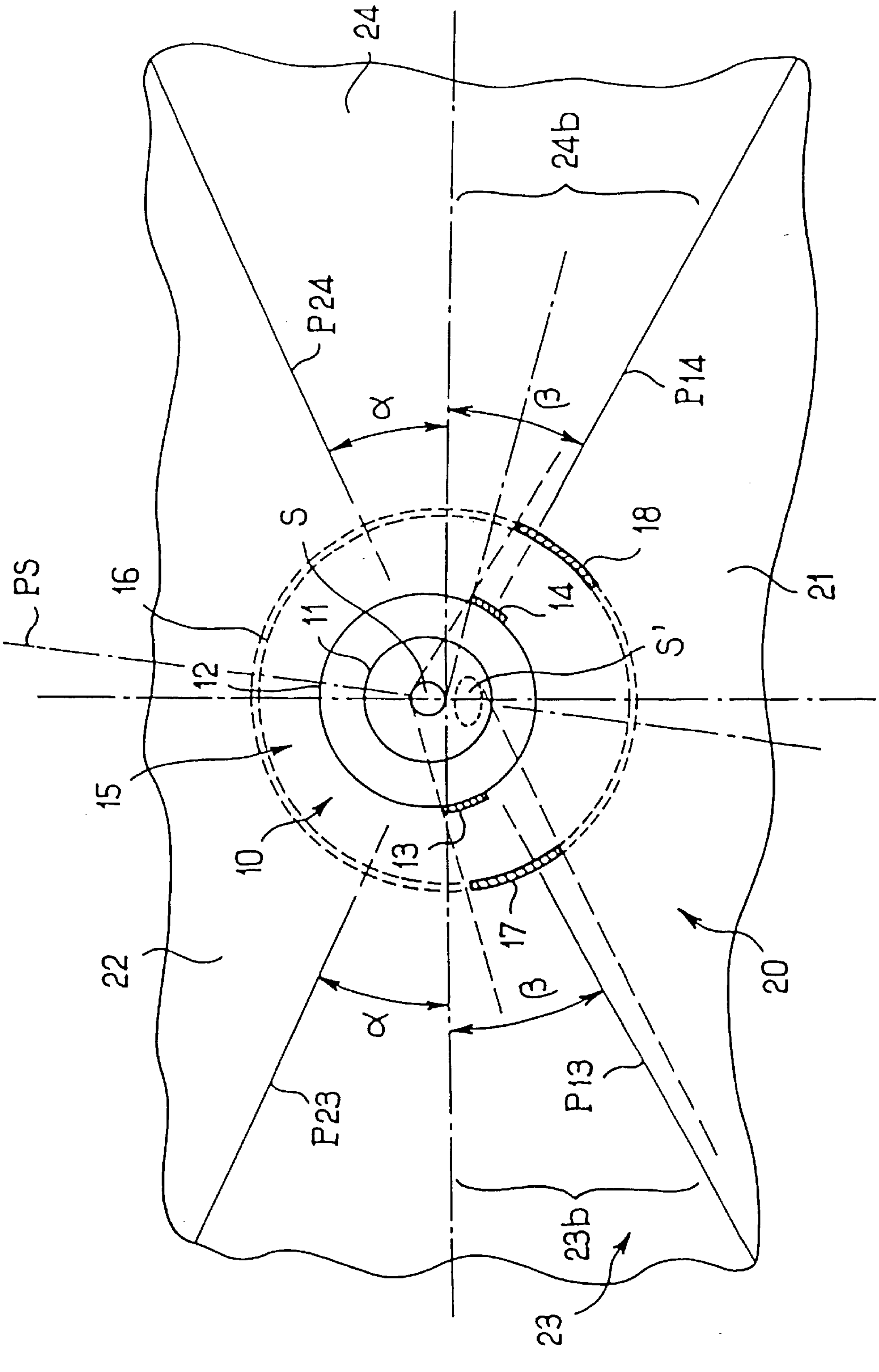
FIG. 4 is a partial back view, on an enlarged scale, of the reflector and lamp assembly of FIGS. 1*a* and 1*b*.

Reference is first made to FIGS. 1*a*, 1*b*, 3 and 4, which show an assembly consisting of a lamp 10 and a reflector 20 in a dipped beam headlight for a motor vehicle. In particular this assembly may comprise a discharge lamp 10 and a reflector 20. With reference especially to FIG. 4, the lamp 10 comprises, in the usual way, a generally cylindrical first bulb 11 having at the level of the arc, S, a boss which is surrounded by a cylindrical second bulb 12. Two opaque longitudinal bands, 13 and 14 respectively, are formed on the second bulb 12. The purpose of these bands 13 and 14 is to mask certain zones 21–24 of the reflector from the light source, in order to prevent the reflector 20, which has interruptions between surfaces in the said zones 21–24 from being able to give off any parasitic radiation above the required cut-off line.

Also provided, in association with the lamp, is a mask, or occulter of direct light, 15. This has a front masking portion 16, which is fixed to the base region of the reflector and is preferably fixed directly to the support of the lamp by means of two opaque longitudinal lugs 17 and 18. The width of these lugs 17 and 18, and their position in relation to the lamp 10, are carefully determined in such a way that the lugs 17 and 18 also constitute masking bands which cooperate with the masking bands 13 and 14 of the second bulb 12 in a manner which will be described later on herein.

The reflector 20 in this example comprises four zones, namely a lower zone 21, an upper zone 22, and two side zones 23 and 24. These zones are separated from each other by transition planes denoted P13, P14 and P23, P24 respectively, which pass close to, or preferably through, the optical axis of the reflector 20.

The lower zone 21 of the reflector 20 is designed to produce from the light source 10 a part of the beam which is very much spread widthwise, and is also very homogeneous and bounded at the top by a generally horizontal cut-off line. To this end, the lower zone 21 preferably consists of individual striations S21 (FIG. 3), which are so designed that firstly they spread the light laterally, and secondly they redirect all of the images from the light source 10 in such a way that their highest regions are essentially aligned with the above mentioned cut-off line.

The striations S21 are for example formed of surfaces which are auto-generatrices of a beam with horizontal cut-off, such as are described in particular in French patent publication FR 2 536 503A. In such surfaces, the horizontal generatrices, which may or may not be parabolic, are chosen to be different from each other in such a way that they intersect, in particular along curved lines as shown, with a slight bend. These horizontal generatrices are also so chosen as to give the required horizontal distribution to the beam.

It will be noted here that the surface in the lower reflector zone 21 is constructed not according to the position of the main light source which consists of the arcs of the lamp 10 (see FIG. 4), but instead, and with advantage, as a function of the position of the secondary light source S' which consists of an accumulation of salts in the bulb 11 of the lamp 10, essentially below the arcs. This is illustrated in particular in FIG. 4.

The upper zone 22 of the reflector is preferably constructed in the same way as the lower zone 21, with striations S22 which are adapted for spreading the light below a horizontal cut-off line, with, again, a high degree of homogeneity. However, as far as the upper zone 22 is concerned, the various striations S22 are constructed as a function of the position of the main light source, which consists of the arcs of the lamp 10.

As to the side or lateral zones 23 and 24 of the reflector 20, these lie on either side of the lamp 10, and are so designed that, according to the angular position of the lamp 10, and therefore according to the angular position of its masking bands 13 and 14 with relation to the reflector 20, the side zones 23 and 24 complete the beam produced by the lower zone 21 and the upper zone 22, so as selectively to raise the cut-off line, either on the left for driving on the left, or on the right for driving on the right.

The side zones 23 and 24 are formed symmetrically with respect to the vertical axial plane of the reflector 20, and therefore only one of the zones (in this case the zone 23) need to be described here in any detail. This zone 23 is divided into two sub-zones 231 and 232 respectively, with the first zone 231 being adjacent to the lamp 10, while the second sub-zone 232 extends between the first and second side edges of the reflector 20.

The sub-zone 231 preferably consists of a reflective surface such as is described in French patent publication No. FR 2 609 146A, in the name of the Company Valeo Vision. Such a reflective surface has the property that it can behave, in cooperation with a mask which limits the angular field of radiation from the source as a paraboloid of revolution, while at the same time spreading the light below the cut-off line, whether the latter be horizontal or inclined. The light source is of the filament type in front of a normalised “H4” lamp. If any further details of such a surface are required, reference should be made to the above mentioned French patent specification. Preferably, a surface is chosen which gives convergence of the radiation, although this convergence is adjusted in such a way that the mask 15 of the lamp does not intercept an excessive quantity of light.

The sub-zone 232 of the reflector side region 23 consists of a base surface in the form of a paraboloid of revolution, on which there are projected striations S232*b* and S232*h* for spreading the light along the cut-off line. Such projected striations are described in the literature, in particular in French patent publication No. FR 2 710 393A in the name of the Company Valeo Vision.

Preferably, and with particular reference to FIG. 3, these striations comprise upper striations S232*h* which extend vertically above the horizontal axial plane of the reflector, together with lower striations S232*b* which extend below the same horizontal axial plane, and which are inclined to the vertical by an angle $\gamma$, which is preferably equal to about 15°. With this arrangement, the upper striations S232*h* are adapted to spread the light horizontally, while the lower striations S232*b* are adapted to spread the light in an inclination of 15° approximately with respect to the horizontal.

It will be noted here that the dimensioning of the side sub-zone 231 and that of the striations in the sub-zone 232 is such that these surfaces provide lateral spreading of the light to a substantially smaller degree than the zones 21 and 22 described earlier herein.

As has already been said, the other side or lateral zone 24 is made symmetrical with the zone 23, and has two sub-zones 241 and 242 with respective striations S242*h* and S242*b*.

With particular reference to FIG. 4, in preferred arrangements the half planes of separation between the various zones 21–24 of the reflector 20 are inclined to each other as follows. Each of the transition planes, or half planes, P13 and P14 is inclined through an angle $\beta$ of 28° below the horizontal. Each of the half planes P23 and P24 is inclined above the horizontal by an angle $\alpha$ of 25°.

The arrangement of the lamp 10 and its various masking bands 13, 14 will now be described, still with reference in particular to FIG. 4. In a manner which is conventional per se, the lamp 10 includes the two opaque longitudinal bands 13 and 14 on its outer bulb 12. In the position shown, which corresponds to a beam suitable for driving on the left, the masking band 13, situated on the left, has its upper edge contained in the vertical plane which passes through the base of the arc of light, while the other band 14 has its upper edge contained in a plane which passes through the base of the arc and is inclined at 15° downwards.

These two upper edges perform a function which is similar to that of the two opposed edges of a masking cap for a normalised “H4” filament lamp.

From their upper edge, the two masking bands 13 and 14 extend downwards over an angular gap of about 25° about the axis of the cylindrical second bulb 12, and are thus disposed symmetrically with respect to a plane of symmetry PS which is inclined by 7.5° with respect to the vertical axial plane.

As to the two masking lugs 17 and 18, the angular extent of these is such as to place them, in relation to that of the bands 13 and 14, in the following way. Still considering the attitude shown in FIG. 4, each masking lug 17 and 18 has an upper edge which is so situated that it does not mask any radiation from the arc passing above the upper edge of the associated band 13 or 14, so as to leave the arc and these upper edges to define the required half cut-off lines. In addition, the masking lugs 17 has a lower edge such that no radiation emitted from the lamp, and in particular from the region S' of its salts, is able to reach the lateral zone 23 of the reflector.

The upper edge of the lugs 17 and 18 and the lower edge of the lug 17 having been defined as above, the lugs 17 and 18 are dimensioned in such a way that they are symmetrical with respect to the plane of symmetry PS. In this way, when the lamp 10 occupies a position which is offset angularly by 15°, so as to produce a beam suitable for use when driving on the right, the lower edge of the masking lug 18 will perform the same masking function that the lower edge of the masking lug 17 performed in the case described above.

Figure 1A:
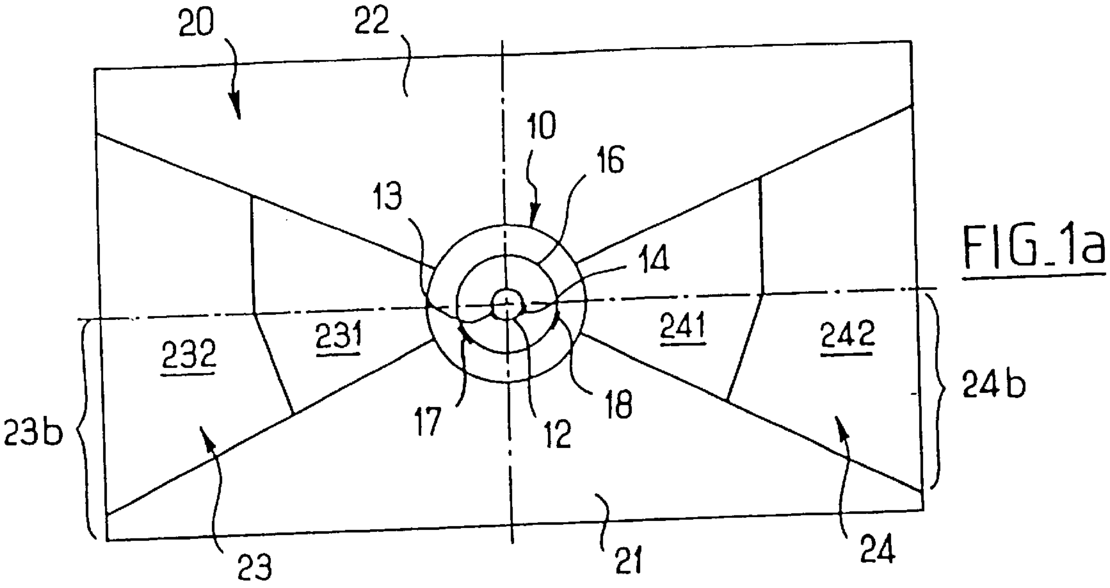
FIG. 1*a* is a diagrammatic back view of an assembly consisting of a reflector and a lamp in a first position with respect to each other, which represents a headlight setting such that a dipped beam is obtained which is suitable for driving on the right hand side of the road.
Figure 2A:
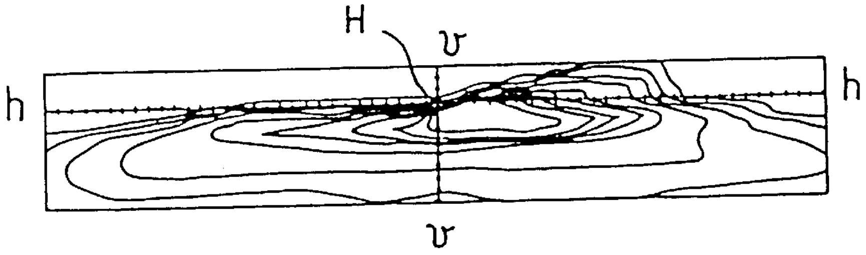
FIGS. 2*a* and 2*b* are sets of isolux curves, showing the appearance of the dipped beams which are produced, by the reflector and lamp assembly in the settings shown in FIG. 1*a* and FIG. 1*b* respectively, the effect of the closure lens of the headlight being ignored.
Figure 1B:
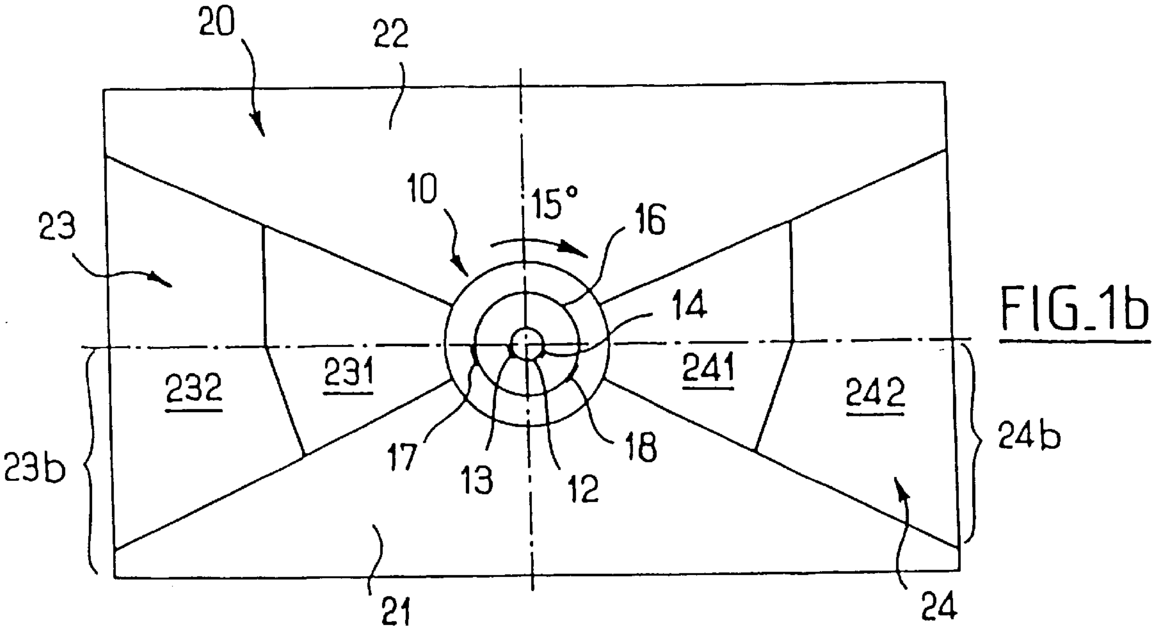
FIG. 1*b* is a diagrammatic back view of the same reflector and the same lamp, in a second mutual position that represents another headlight setting, which is suitable for giving a dipped beam for traveling on the left hand side of the road.
Figure 2B:
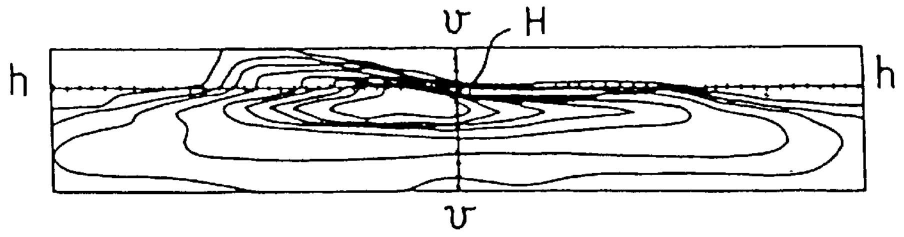

It will be understood that the lamp 10, with its mask 15, may be mounted within the reflector 20 in such a way that they can assume either one of two stable orientations, the first being the one shown in FIG. 1*a,* and the other being the one shown in FIGS. 1*b* and 4.

Figure 6A:
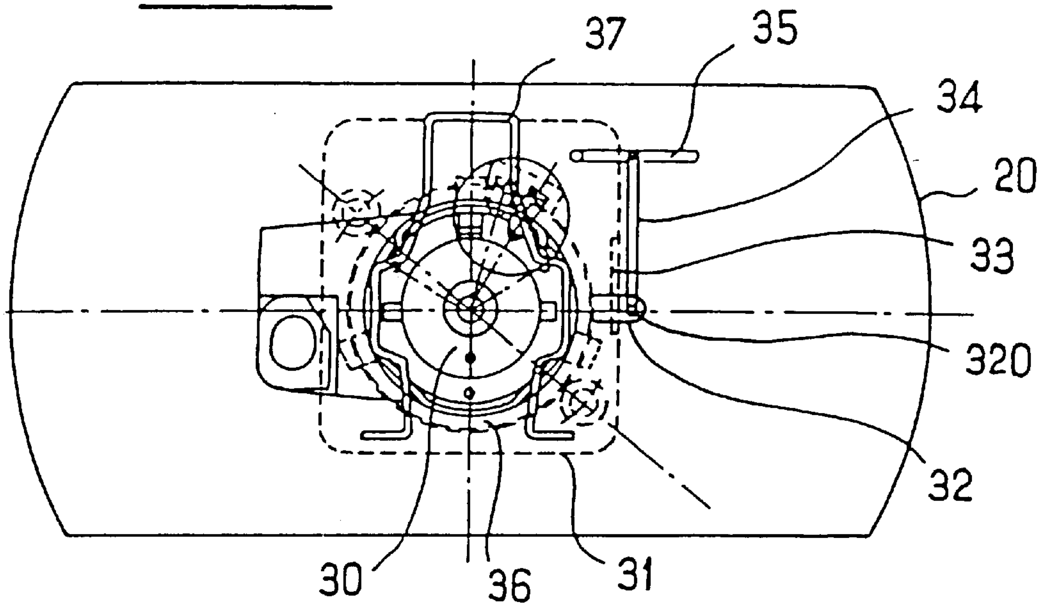
FIGS. 6*a* and 6*b* are back views showing a first embodiment of a means which enable the lamp to be put selectively into the two working positions, or settings, of the headlight in accordance with the invention, in which it produces a beam for use when driving on the right and a beam for driving on the left, respectively.
Figure 6B:
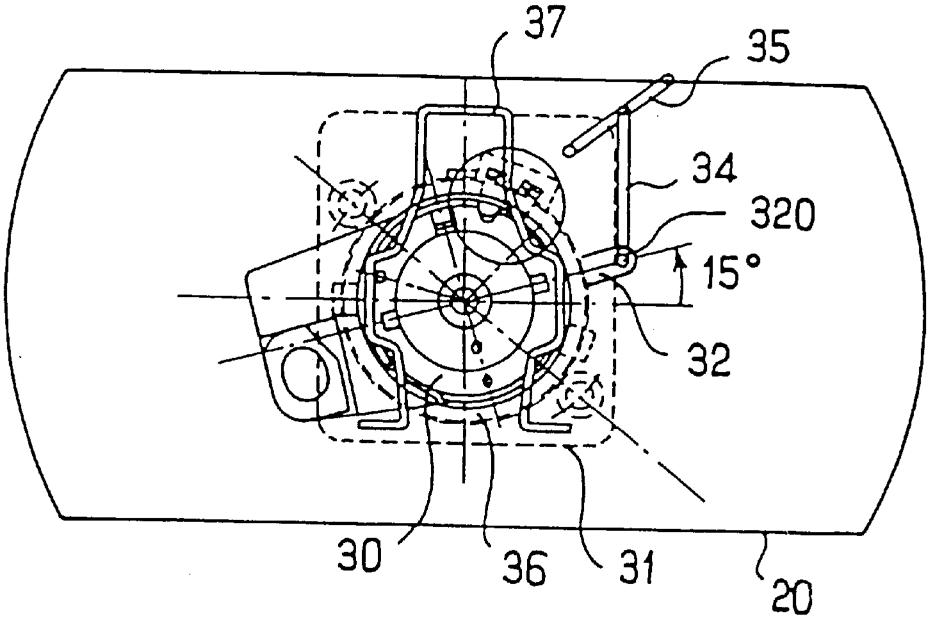

Reference will now be made in particular to FIGS. 6*a* and 6*b,* to describe the means which enable the position of the assembly consisting of the lamp and mask to be varied between the two angular positions corresponding to two modes of emission of the headlight, and to ensure stability of this assembly in each of those two positions.

FIGS. 6*a* and 6*b* are two representations showing a first embodiment of these positioning and stabilising means. FIG. 6*a* shows the position in which the headlight produces a beam suitable for driving on the right, while in FIG. 6*b,* the headlight is set for driving on the left. These FIGS. 6*a* and 6*b* also show the outline of the reflector 20. The positioning and stabilising means are mounted in the base of the reflector 20.

With reference firstly to FIG. 6*a,* a generally circular support member 30 is mounted for pivoting movement about the optical axis of the headlight, concentrically with a lamp hole in which the lamp 10 and its mask 15 (which are not shown in this Figure) can be mounted. The lamp 10 and its mask 15 are arranged to be fixed on the support member 30 in a reference position which is defined in the axial and transverse directions and angularly. The broken line 31 shows the outline of the trap for giving access to the lamp.

A lug 32 is fixed to the support member 30 and projects radially outwards from the perimeter of the support member 30, extending substantially horizontally in the configuration shown in FIG. 6*a*.

The lower end of a vertical link 34 is articulated on a pivot pin 320 which is formed in the free end region of the lug 32. The upper end of the link 34 is pivoted on a central point of a control arm 35, one end of which (that is to say the one on the left in the Figures) is articulated on a pivot pin 320 fixed to the reflector 20. The other end of the link 34 constitutes a working region which is accessible to the finger of the user through the lamp access trap 31.

The movements of the support member 30 and its lug 32, together with those of the link 34 and the arm 35, all take place in a plane which is transverse to the optical axis of the reflector 20.

A crown 36 is arranged concentrically around the pivoted support member 30, The crown 36 consists for example of a rear collar portion which is formed integrally on the reflector 20 by moulding.

A conventional spring steel clip 37 of the hairpin type is articulated on the rear of the reflector 20, and can be locked in order to retain in the axial direction, firstly the lamp 10 on the support member 30, and secondly the support member 30 on an engagement surface which is formed on the rear of the reflector and which is bounded by the crown 36. This fastening, which holds the lamp 10 against any rotation with respect to the support member 30 (by means of suitable conventional angular indexing means), does not however prevent rotational movement of the support member 30 about the optical axis of the reflector. This rotational movement is also guided by the crown 36. The freedom of the support member 30 to be rotated is for example ensured by engaging the curved bearing zones of the spring clip 37 against the smooth zones of the collar portion of the lamp 10. The spring clip 37 ensures that the lamp 10 can be easily removed for replacement.

Figure 7A:
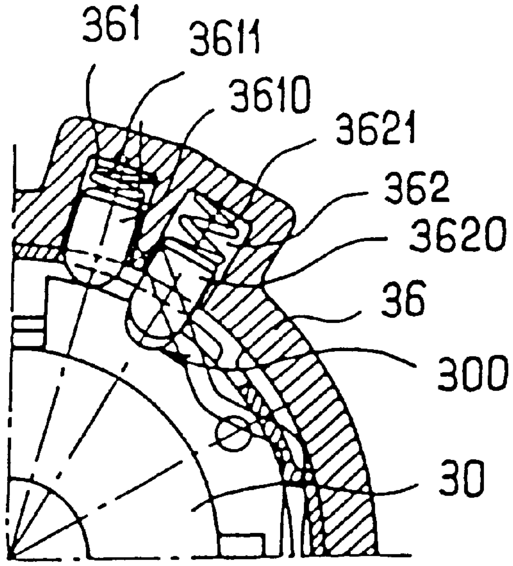
FIGS. 7*a* and 7*b* are two detail views of means for stabilizing the position of the lamp in each of the two working positions corresponding to FIGS. 6*a* and 6*b* respectively.

As can be seen best in FIG. 7*a*, the lamp has a collar portion or lamp cap, which includes, in a clearly defined angular position, a substantially hemispherical notch 300 of a given diameter which is open on the outer periphery of the lamp cap facing towards the crown 36. As to the crown 36 itself, this has two respective blind holes 361 and 362 which are spaced apart by a predetermined angle, in this example 15°, and which are open radially inwardly on the lamp 10.

Movable locating fingers 3610 and 3620, mounted in the blind holes 361 and 362 respectively, are biased radially against the periphery of the lamp by means of springs 3611 and 3621 respectively, these spring being compressed between the base of the respective blind holes 361 and 362 and an internal engagement face of the associated finger. The fingers 3620 and 3610 have substantially hemispherical free ends and a diameter which is slightly greater than that of the notch 300.

When the notch 300 in the lamp cap is aligned with one of the two fingers 3610 or 3620, the spring 3611 or 3621 associated with that finger is then in partial engagement with the rounded end of that finger in the notch. This cooperation of the finger with the notch 300 of the lamp accordingly ensures stability of the lamp and of the support member 30 to which it is fixed, in the required angular position.

On the other hand, the fact that the fingers are not able to be engaged totally in the notch 300 enables the lamp and the support member 30 to be released easily by exertion of no more than a reasonable amount of effort to act on the linkage described above which includes the link 34.

The stiffness of the springs 3611 and 3621 is, in this connection, quite large, so that, in the absence of any force exerted from the link 34, the support member can be retained reliably in its position despite, in particular, vibrations arising from operation of the vehicle. At the same time, the stiffness of these springs is low enough to enable the position of the support member 30 to be changed quite easily.

The two fingers 3610 and 3620, which are spaced apart by 15° on the periphery of the crown 36, define the two working positions of the lamp 10 and therefore the two headlight settings, so that the headlight can selectively give a dipped beam for driving on the left and a dipped beam for driving on the right, respectively. In another version, it is of course possible to provide a single finger which is then able to cooperate with two notches 300.

The operator displaces the lamp 10 towards one or the other of these two reference or working positions by maneuvering the control arm 35 using his (or her) finger inserted through the lamp access trap 31. In particular, by lifting the free end of the control arm 35 from the position of the latter shown in FIG. 6*a*, this arm raises the link 34 and the lug 35, and this causes the support member 30, and therefore the lamp 10, to be rotated to the other stable position.

Figure 7B:
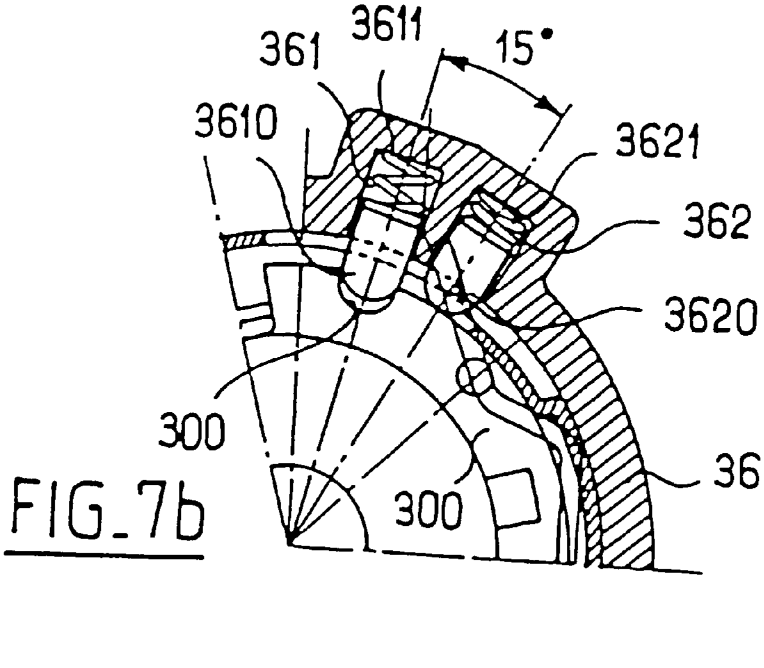

It will be appreciated that FIG. 6*b* and FIG. 7*b* are views similar to those in FIGS. 6*a* and 7*a*, but that they show the support member 30 in its second position corresponding to driving on the left.

Conversely, by pushing the control arm 35 downwards, the support member 30 is put into the position shown in FIGS. 6*a* and 7*a*.

Figure 8B:
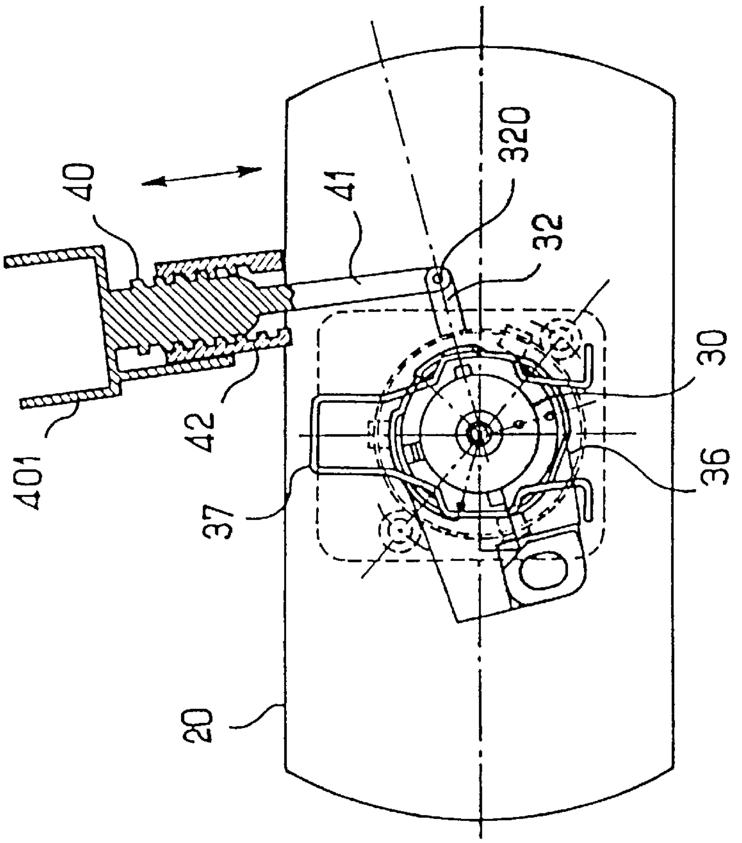
FIGS. 8*a* and 8*b* are back views of a second version of the above mentioned means in accordance with the invention.
Figure 8A:
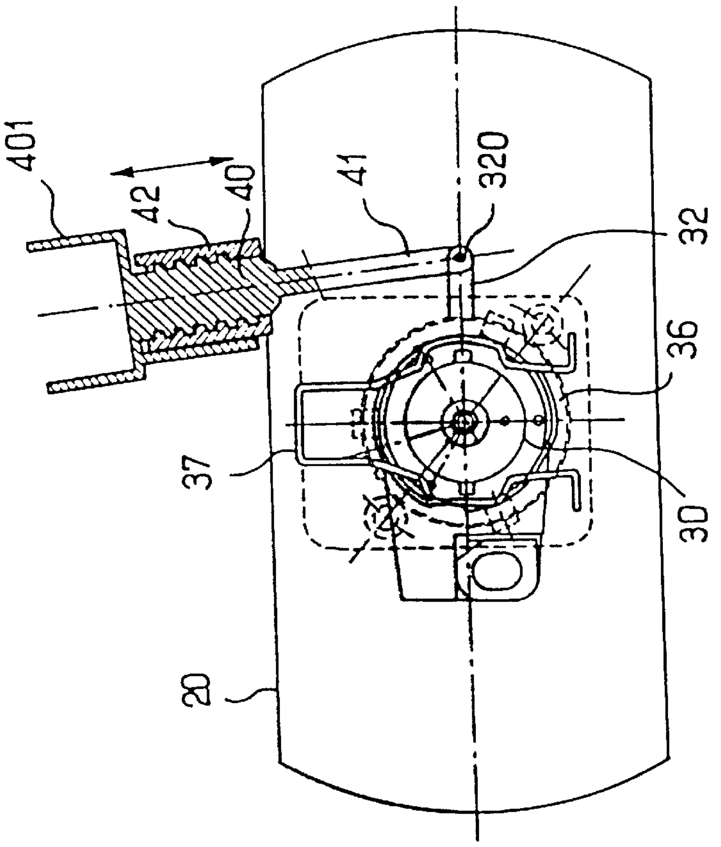

Reference is now made to FIGS. 8*a* and 8*b*, which show a second version of an arrangement according to the invention. In these Figures, the support member 30 and its lug 32 are substantially identical to those in FIGS. 6*a* and 6*b*. However, the means for displacing and locating the support member 30 are different. In FIGS. 8*a* and 8*b*, those elements or parts which are identical or similar to those in FIGS. 6*a* and 6*b* are designated by the same reference signs.

In this second embodiment, the displacement of the lug 32 is provided by a link 41 which is articulated on the lug 32 at the lower end of the link 41. The link 41 is fixed at its upper end to a screw 40 for axial movement with the latter. The link 41 is mounted for free rotation on the screw 40, but coupled to the latter for straight line movement with it, by any known type of mating coupling, such as a ball joint (not shown).

The screw 40 is in cooperation with a nut 42 which is formed for example in the top wall of the headlamp housing (not shown), and has a maneuvering portion 401 which is situated on the outside of the headlamp housing. Manual rotation of the screw 40, by means of its maneuvering portion 401, enables the support member 30 to be put selectively into either one of two reference positions, which in this example are preferably determined by the end of travel of the screw action of the screw 40 in its nut 42, resulting from appropriate design of these elements.

Stability of the support member 30 and lamp 10 in each of the reference positions is also ensured by appropriate design of the screw 40 and nut 42, by minimizing the axial clearances of the threads and ensuring at the same time a sufficiently high coefficient of friction to avoid, especially having regard to vibrations in operation of the vehicle, any unwanted relative rotation between the screw and the nut.

One advantage of this second embodiment of the invention lies in the fact that changing the position of the lamp can be carried out directly from outside the headlamp housing, without having to open the lamp access trap. In this connection, the first embodiment described earlier can easily be adapted so that maneuvering can in that case also be carried out from outside the housing.

As has been indicated above, the present invention is applicable to a headlight with a discharge lamp, in particular of the type described herein. However, it can also be applied to a headlight which is equipped with a lamp having a filament cooperating with a mask of the cup type, such as a lamp of the "H4" normalized type, cooperating either with a parabolic reflector or with a reflector having surfaces which are specifically designed to give rise to dipped beams for traffic on the left and for traffic on the right according to the position of the mask.

What is claimed is:

1. A motor vehicle headlight, comprising:

a reflector;

a lamp having at least a masking portion mounted in the reflector, wherein the reflector has a reflective surface adapted to selectively generate two types of dipped beam, a first dipped beam for accommodating driving on a left hand side of a road and a second dipped beam for accommodating driving on a right hand side of a road, respectively, the reflector further including a support member which is able to rotate with respect to the reflector and on which the lamp is mounted fixedly, wherein upon rotation of the support member the lamp is rotated between two angular positions with respect to an optical axis of the reflector such that the first dipped beam is generated in a first angular position and the second dipped beam is generated in a second angular position;

an actuating device operative with the support member for manually rotating the support member between two working positions corresponding to the two angular positions; and an assembly connected to a fixed part of the headlight for stabilizing the support member in each of the two working positions.

2. A motor vehicle headlight according to claim 1, wherein the support member has a generally circular form and is guided in rotation by an arrangement provided at a rear portion of the reflector.

3. A motor vehicle headlight according to claim 2, further including a locking device for securing the lamp fixedly on the support member and for providing axial retention of the support member with respect to the reflector.

4. A motor vehicle headlight according to claim 3, wherein the locking device comprises at least one of an elastic hairpin fastener and a spring clip, in engagement against smooth zones of a lamp cap of the lamp.

5. A motor vehicle headlight according to claim 1, wherein the actuating device includes a link articulated on the support member.

6. A motor vehicle headlight according to claim 5, wherein the actuating device further includes a control arm pivoted on the link and adapted to displace the link.

7. A motor vehicle headlight according to claim 5, wherein the actuating device further includes a screw and nut assembly fixed to the said link for straight line movement with the link.

8. A motor vehicle headlight according to claim 7, wherein a portion of the screw and nut assembly is formed on a housing of the headlight.

9. A motor vehicle headlight according to claim 8, wherein the screw and nut assembly having end of travel positions corresponding to the two working positions of the support member.

10. A motor vehicle headlight according to claim 9, wherein the screw and nut assembly comprises threads having substantially no axial clearance and a predetermined minimal coefficient of friction.

11. A motor vehicle headlight according to claim 7, wherein the screw and nut assembly having end of travel positions corresponding to the two working positions of the support member.

12. A motor vehicle headlight according to claim 11, wherein the screw and nut assembly comprises threads having substantially no axial clearance and a predetermined minimal coefficient of friction.

13. A motor vehicle headlight according to claim 1, wherein the assembly comprises at least one finger fixed to the reflector and biased resiliently towards a notch defined on a lamp cap of the lamp.

14. A motor vehicle headlight according to claim 13, wherein each finger has a rounded end and the notch has a width smaller than a width of each finger.

15. A motor vehicle headlight according to claim 1, wherein the lamp comprises a discharge lamp having at least one masking portion.

16. A motor vehicle headlight according to claim 1, wherein the lamp comprises at least one incandescent filament including a mask of the cup type.

* * * * *